United States Patent Office 2,759,827
Patented Aug. 21, 1956

2,759,827
PROCESS FOR RETARDATION OF THE DETERIORATION OF PRODUCE

Curtis E. Griffin, Rhododendron, Oreg.

No Drawing. Application April 7, 1954,
Serial No. 421,670

5 Claims. (Cl. 99—154)

This invention relates to a method for retarding the deterioration of garden produce and cut vegetation and more particularly relates to a new composition for treating garden produce and the method of making such composition.

It is a well known fact that garden produce and cut, decorative vegetation such as ferns rapidly deteriorate after harvesting and a tremendous percentage of loss occurs because of spoilage between the time the produce is harvested and when it is purchased by the housewife or other consumer. Other losses occur because the produce deteriorates in appearance and, accordingly, it must be sold for a lower price than it could have been sold if of better appearance.

It is an object of the present invention to provide a process for treating garden produce and the like which will serve to retard the deterioration thereof.

More particularly it is an object to provide a composition useful for treating fruits and vegetables which will cause the treated produce to retain its fresh appearance for a greater period of time than if untreated.

A further object of the invention is to provide a composition for treating fruits and vegetables which will cause the same to retain their fresh flavor over an extended period of time.

Still another object of the invention is to provide a composition of the class described that is substantially colorless, odorless and systemically harmless.

A further object is to provide a composition of the class described that leaves no visible residue on products treated therewith.

Another object is to provide a composition of the class described that will not affect the natural flavor of the product treated.

A still further object of the invention is to provide a composition for treating products of the class described that may be manufactured inexpensively and used economically.

A still further object of the invention is to provide a process for preparing the composition of the invention.

Other objects and advantages of the invention will become more apparent hereinafter.

The exact nature of the composition of the invention is not known nor is it known exactly how the composition acts in preventing deterioration of freshness, appearance and flavor of the products with which it is treated. Nevertheless, exhaustive tests substantiate the fact that the composition of the invention is effective in retarding the deterioration of the flavor and appearance of freshness of almost all products which are treated therewith. The composition of the invention is formed by mixing together water, citric acid, hydrogenated vegetable oil and sugar. All tests have indicated that the proportions of the mixture are more or less critical and the procedure by which they are added to one another and mixed together is indicated as definitely critical.

The following example is given to illustrate the practice of the invention. By weight, thirteen hundred seventy (1370) parts water, 66 parts citric acid and 9 parts hydrogenated vegetable oil melting at about 90° F. are placed in a suitable vessel and slowly heated to above the melting point of the oil and preferably to about 160° F. while vigorously agitating the mixture. When the temperature of the mixture reaches 160° F. the heating is ceased, and the agitation continued while the batch is permitted to cool, preferably slowly over approximately a 24 hour period. When the batch is at room temperature, the agitation is discontinued, and the batch allowed to stand whereby a stratification occurs between a heavier watery mass or liquid suspensoid or suspension and a lighter mass which appears to be made up primarily of solidified particles of the vegetable oil. The oil particles are skimmed off the liquid suspension or otherwise suitably separated and discarded.

The watery mass that remains is slightly cloudy in appearance but for all practical purposes is stable since no immediate separation will occur, though a settling out will occur if the solution is allowed to stand quiescent over a period of several months. The exact nature of this watery mass or suspension has not as yet been determined. Though this watery mass apparently is not a true suspension in that a separation will occur over a lengthy period of time, for convenience it will be referred to hereinafter as a liquid suspension or suspensoid.

To the separated suspension, approximately 40 parts by weight of glucose, preferably as an 80 per cent aqueous solution, is added and the mix vigorously stirred for several hours to assure thorough mixing. The resulting liquid composition is effective in retarding the deterioration of fruits and vegetables treated therewith in a manner described more fully hereinafter.

If desired, a small quantity of solution preservative such as benzoate of soda may be added to the composition to deter mold growth in the composition. This is particularly desirable if the composition is not to be used immediately. Also, a wetting agent may be added to the composition though this, too, is optional.

The ratios of the components set forth in the example above are more or less critical although there may be some deviation from the ratios given. In the case of the hydrogenated oil, it will be noted that the amount originally added is in excess of the amount that is capable of combining with the water and the citric acid either by reaction or dissolution. This was found to be necessary to obtain a composition effective to prevent deterioration in fruits and vegetables. Compositions prepared utilizing hydrogenated oil in amounts much below the optimum given in the example did not exhibit an effectiveness to retard deterioration of produce treated therewith. On the other hand, increasing the amount of vegetable oil did not appear to increase the effectiveness of the resulting composition and the use of vegetable oil in too great excess resulted in a heavy mixture that was hard to mix and from which the liquid suspension could be separated only with difficulty.

The solid mass which separates out from the cooled suspension differs in appearance from the original oil in that the residue is a gummy, sticky product and cannot be reused. It has not been determined if the hydrogenated oil undergoes a chemical change though it is to be noted that it retains its original white color.

The hydrogenated oil with which best results have been observed is sold under the trademark "Spry" and has a melting point of about 90° F.

As indicated hereinbefore, it is only necessary to heat the initial mixture to above the melting point of the oil though it has been preferable to heat the mixture to 160° F. to increase the fluidity of the oil and facilitate its complete intermixture with the water and citric acid.

Best results have been observed when glucose has been used in the preparation of the composition though compositions prepared with other sugars have retarded the deterioration of produce. For example, a corn syrup sugar product sold under the trademark "Karo" has been used successfully.

The process for preparing the composition appears definitely to be critical. Attempts to prepare the composition by mixing and heating all of the constituents at one time have been totally unsuccessful and other attempted variations have not proved satisfactory. Again, the reason for the success on the one hand and the failures on the other hand cannot be explained.

Like the intermediate liquid suspension, the final composition is very slightly cloudy and a separation of lighter solid particles will occur upon standing for a lengthy period. However, the effectiveness of the composition as a treating agent for produce does not appear to diminish with time and the suspension can be readily re-established by stirring the liquid and separated particles. The composition has no odor and is systemically harmless.

Garden produce and cut vegetable products such as ferns and holly are treated with the composition of the invention by spraying or dipping or, in the case of stem products such as asparagus and ferns, the butt ends of the stems may simply be immersed in the solution. Listed below are some of the fruits and vegetables which have been treated with the composition of the invention and which, as compared with similar untreated vegetables, have had an extended period of salable life. That is to say, the treated vegetables and fruits retained a freshness in appearance and flavor even after the period when the untreated produce had deteriorated to the point where it was no longer salable. These products are:

| Parsley | Green corn |
| Carrots | Zucchini |
| Spinach | Bell pepper |
| Broccoli | Cucumbers |
| Mustard greens | Apples |
| Celery | Cherries |
| Radishes | Oranges |
| Beets | Lemons |
| Peas | Grapefruit |
| String beans | Apricots |
| Green onions | Strawberries |
| Leeks | Cantaloupe |
| Cauliflower | Rhubarb |
| New potatoes | Grapes |
| Avocados | Plums |
| Tomatoes | Pears |

The results are not always consistent and in some instances no improvement in salable life of the treated produce has been observed as compared with the salable life of untreated produce. However, in the instance of those vegetables and fruits listed above, it has been found that treating the fruits or vegetables with the composition of the invention rather consistently improves the salable life of the treated products, that is, the treated products do not deteriorate in flavor, appearance or moisture loss as rapidly as untreated produce kept under identical conditions.

In the case of a few products, namely, peaches, lettuce, cabbage and endives, little if any improvement in their keeping qualities was noted when they were treated with the composition of the invention. Why these products do not respond to treatment with the composition and why others do has not as yet been explained.

Notable success has been experienced in treating ferns with the composition of the invention. Wild fern fronds, cut and dipped the same day in the composition of the invention, were found to be in salable condition five months later. A batch of ferns cut at the same time and merely dipped in water and stored under identical conditions with the treated ferns had completely deteriorated long before the end of the five month period.

Asparagus has always been a troublesome product to handle since the stalks soften and lose weight rapidly after cutting. However, asparagus treated with the composition of the invention retained a fresh appearance, remained crisp and suffered little weight loss even one to two weeks after untreated asparagus had completely deteriorated from a salable condition.

While both fern fronds and asparagus stalks may be sprayed or dipped in the composition of the invention, the uniqueness of the invention is illustrated in the case of these items in that merely placing the stems of the ferns or the butt ends of the asparagus stalks in the solution enhances the keeping qualities of the treated items. These results clearly show that the composition of the invention does not achieve its results by forming a coating on the surface of the treated products as is the case of some of the preservative compositions used heretofore.

In some instances wilted produce dipped in the composition of the invention has been revived markedly in appearance.

While the effectiveness of the composition of the invention for retarding wilting and general deterioration of cut vegetation such as holly and Christmas trees has not as yet been put to test, there is reason to believe that the deterioration of such vegetation will be retarded if treated with the composition. Other instances in which the composition of the invention may be used will occur to those skilled in the art.

Treatment of produce in accordance with the invention may be carried out rapidly and economically since it is only necessary that the treated produce be exposed briefly as by dipping in the composition and thereafter the produce may be drained thoroughly to prevent loss of the composition. The composition leaves no visible residue on the treated produce.

Having illustrated and described a preferred embodiment of the invention, it should be apparent to those skilled in the art that the invention permits of modification in details. I claim as my invention all such modifications as come within the true spirit and scope of the appended claims.

I claim:

1. The process for preparing a composition useful for treating garden produce to retard the deterioration of the same comprising the steps of vigorously agitating a mixture, by weight, of about 1370 parts water, 66 parts citric acid and 9 parts hydrogenated vegetable oil while heating said mixture to about 160° F., thereafter slowly cooling said mixture to room temperature while continuing the agitation thereof, permitting the cooled mixture to stand for a short period whereby a stratification occurs between a heavier watery mass and a lighter, solid mass, separating said watery mass from said solid mass, and thereafter dissolving about 40 parts sugar in said watery mass.

2. The process for preparing a composition useful for treating garden produce to retard deterioration of the same, comprising the steps of heating to about 160° F. a mixture of 1370 parts water, 66 parts citric acid and 9 parts hydrogenated vegetable oil and agitating said mixture while heating the same, slowly cooling said mixture to room temperature and thereafter separating the undissolved solids from the liquid suspension obtained, and adding about 40 parts glucose to said separated liquid suspension.

3. A method of treating garden produce to retard deterioration thereof which comprises treating said produce with the product formed by agitating together while heating to 160° F. a mixture of 1370 parts water, 66 parts citric acid and 9 parts hydrogenated vegetable oil, cooling said mixture to room temperature and thereafter separating any undissolved solids from the watery suspension obtained, and finally dissolving about 40 parts glucose in said watery suspension.

4. The product for treating fruits and vegetables formed by mixing and heating to about 160° F. 1370 parts water, 66 parts citric acid and 9 parts hydrogenated vegetable oil, slowly cooling the heated mixture to room temperature while continuing mixing of the same, thereafter separating undissolved solids from the liquid mass obtained, and adding about 40 parts of glucose to said separated liquid mass.

5. The product for treating fruits and vegetables resulting from the steps of mixing and heating to about 160° F. 1370 parts water, 66 parts citric acid and 9 parts hydrogenated vegetable oil, slowly cooling said mixture to room temperature, separating any undissolved solids from the watery mass obtained, and dissolving about 40 parts sugar in said separated watery mass.

References Cited in the file of this patent

UNITED STATES PATENTS

| | | |
|---|---|---|
| 2,005,184 | Forrest | June 18, 1935 |
| 2,434,388 | Brehm | Jan. 13, 1948 |
| 2,641,548 | Heinrich | June 9, 1953 |